Figure 1:
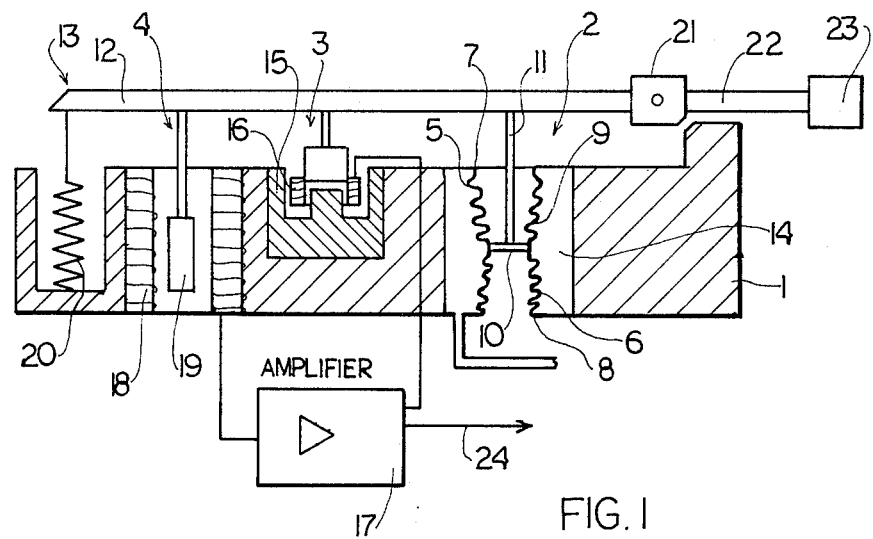

United States Patent [19]

Twisselmann

[11] 4,289,034

[45] Sep. 15, 1981

[54] DEVICE FOR CONVERTING PNEUMATIC OR HYDRAULIC PRESSURE INTO AN ELECTRIC CURRENT AND VICE VERSA

[75] Inventor: Lorenz Twisselmann, Isernhagen, Fed. Rep. of Germany

[73] Assignee: VDO Adolf Schindling AG, Frankfurt am Main, Fed. Rep. of Germany

[21] Appl. No.: 4,131

[22] Filed: Jan. 17, 1979

[51] Int. Cl.³ .............................................. G01L 9/10
[52] U.S. Cl. ........................................ 73/701; 73/722
[58] Field of Search ................. 73/701, 722, 728, 729, 73/708

[56] References Cited

U.S. PATENT DOCUMENTS

| | | | |
|---|---|---|---|
| 2,521,477 | 9/1950 | Pellettere | 73/701 |
| 2,980,835 | 4/1961 | Williams | 73/701 |
| 3,084,551 | 4/1963 | Westman | 73/729 |
| 3,461,726 | 8/1969 | Ziegler | 73/701 |

Primary Examiner—Donald O. Woodiel
Attorney, Agent, or Firm—Martin A. Farber

[57] ABSTRACT

A device for converting a pneumatic or hydraulic pressure into an electrical current and vice versa according to the compensation principle, with a pressure transducer with a pressure-dependent moveable element, an electromagnetic force transducer, the moveable part of which force transducer standing in connection with the element, and a position indicator transmitter which converts the movement of the pressure transducer into an electrical or pneumatic control signal for the force- or pressure transducer. As a pressure transducer, there are provided two bellows with slightly different operative or effective surfaces which respectively are each fixed on one end and with their other ends stand in connection with one another and with the moveable element and are subjected to the same pressure.

12 Claims, 2 Drawing Figures

U.S. Patent  Sep. 15, 1981  4,289,034

DEVICE FOR CONVERTING PNEUMATIC OR HYDRAULIC PRESSURE INTO AN ELECTRIC CURRENT AND VICE VERSA

The invention relates to a device for converting a pneumatic or hydraulic pressure into an electrical current and vice versa according to the compensation principle, with a pressure transducer with a pressure-dependent moveable element, an electromagnetic force transducer, the moveable part of which force transducer standing in connection with the element, and a position indicator transmitter which converts the movement of the pressure transducer into an electrical or pneumatic control signal for the force- or pressure transducer.

Known devices of this type frequently contain a bellows as a pressure transducer, a moving coil system as an electromagnetic force transducer and an electrical or pneumatic position indicator transducer, respectively, depending upon if the pressure is to be converted into current or if the current is to be converted into pressure. The individual transducers act in general on a rotatably mounted lever. These devices have the disadvantage that when they are constructed for conversion of high pressures they have a large construction volume and a comparatively high power requirement.

It is an object of the present invention to overcome this disadvantage.

Consequently it is an object of the invention to create a pressure-current-converter and a current-pressure-converter, respectively, with the smallest possible construction volume, the power requirement of which is as low as possible even during conversion of high pressures. In addition the converter is to have a construction which is advantageous in production and which can be realized with a low financial cost.

This object is aided in its solution in accordance with another object of the invention in that as a pressure transducer (2), there are provided two bellows (5, 6) with slightly different operative or effective surfaces which respectively are each fixed on one end (7, 8) and with their other ends (9, 10) stand in connection with one another and with the moveable element (11) and are subjected to the same pressure.

By this measure in accordance with the invention it is achieved that even with a large pressure difference between the pneumatic or hydraulic pressure which is to be converted and the normal or standard pressure, the force which is exerted by the moveable element of the pressure transducer on the electromagnetic force transducer is small and consequently the compensation force which is produced by the force transducer likewise can be small. The compensation force furthermore has the consequence that in comparison to the known conversion devices, the force transducer suffices with a substantially smaller power input. Beyond that the possibility exists to connect the pressure transducer and the force transducer directly with one another, that is, without the intermediate connection of a lever transmission therebetween, or to arrange a space-conserving lever transmission between both transducers. In this manner the construction volume of the conversion device of this invention is considerably reduced in comparison to that of the known devices. A particular advantage of the device in accordance with the invention is that changes of the operative or effective bellow surfaces only in their differences between the two bellows have an effect on the measurement result. The consequence is an essentially lower dependency of the measurement result on the ambient temperature of the surroundings.

According to an advantageous embodiment of the invention the moveable element (11) of the pressure transducer and the moveable force transducer part (16) engage on different positions of a rotatably mounted lever arm (12) and the moveable part (19) of the position transmitter or transducer (4) engages on a further rotary point (fulcrum) - remote position of the lever (13). In this manner the force which is to be employed by the force transducer for compensation of the forces which originate from the pressure transducer may be reduced further.

It has proven advantageous to let a spring (20) engage on a rotary point (fulcrum) - remote position of the lever arm (13). With such a spring, which can be formed as a pressure or compression spring or a tension spring, the characteristic curve of the bellows can be varied such that the effective bellows surface remains constant over pressure.

In a preferred embodiment of the invention the moveable element (11), the moveable force transducer part (16), the moveable position indicator transmitter part (19) and under circumstances if necessary the spring (20) engage on one arm (12) of the lever (13), while the other arm (22) is provided with a counterweight (23). Such a construction permits a particularly easy balancing of the device, whereby the latter even becomes insensitive to transverse accelerations.

Figure 2:
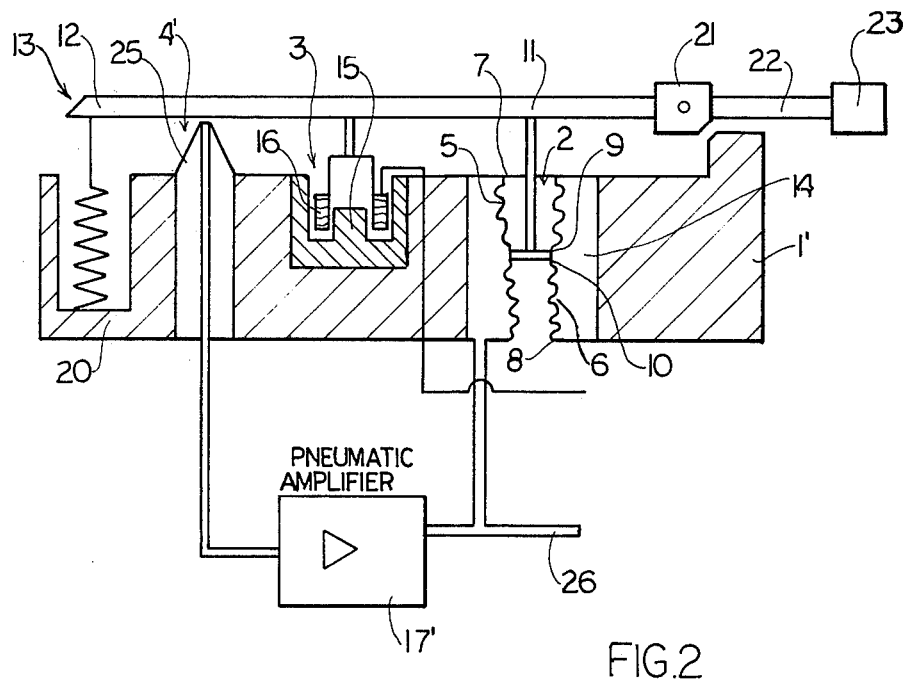

With the above and other objects and advantages in view, the present invention will become more clearly understood in connection with the detailed description of two preferred embodiments, when considered with the accompanying drawing, of which:

FIG. 1 is a sectional view of a device for converting a pneumatic pressure into a current; and FIG. 2 is a sectional view of a device for converting an electrical current into a pneumatic pressure signal.

With the pressure-current-converter or transformer according to FIG. 1, the pressure transducer 2, the force transducer 3 and the position transducer 4 are arranged in a holder 1.

The pressure transducer 2 is made of two bellows 5 and 6, the respective outer ends 7 and 8 of which are secured on the holder 1 and their inner other ends 9 and 10 are connected with one another and engage the arm 12 of a lever 13 via a bar 11 constituting a moveable element. The inner spaces of the bellows 5 and 6 are applied with normal or atmospheric pressure, while the annular space 14 which is formed by the bellows 5 and 6 and the holder 1 is applied with the pressure signal which is to be converted. As evident from the drawing, the bellows 5 and 6 have slightly different operative or effective surfaces.

The force transducer 3 contains a ferrite core 15 and a cooperating plunger or moving coil 16, which coil also engages the lever arm 12. By an amplifier 17 the coil 16 is applied with such a current that the force produced by the moving coil system respectively at times is counter-balanced via the lever 13 with respect to the force originating from the pressure transducer 2. The corresponding control of the amplifier 17 is brought about by means of the position indicator transducer 4, the latter being made of a coil 18 with a plunger-type armature 19 (the moveable position transducer part) fastened to the lever arm 12.

A spring 20 is fastened to the end of the lever arm 12. The other end of the spring 20 is secured to the holder 1. By means of the spring 20 the characteristic curve of the bellows combination can be varied such that the effective surface remains constant over pressure.

The lever 13 is rotatably mounted at the fulcrum point 21 and is provided on its other arm 22 with a displaceable counterweight 23.

In the balanced condition of the converter, the amplifier 17 emits a current signal via the output line 24, which current signal is proportional to the pressure signal to be converted.

The current-pressure-converter according to FIG. 2 has the same construction as the previously described converter in the essential points. Also here the pressure transducer 2, the force transmitter 3 and the position indicator transducer 4' are located in a holder 1'. The position transducer 4' comprises a nozzle 25 and the arm 12 of the lever 13, which arm serves as a baffle plate cooperating with the nozzle. The position transducer 4' controls a conventional pneumatic amplifier 17', the output 26 of which communicates with the pressure space 14 of the bellows. The electric current signal to be converted is fed to the moving coil 16 of the force transducer 3.

In the balanced condition of the converter the amplifier 17' emits a pressure signal at the output 26, which signal is proportional to the current signal to be converted.

While I have disclosed two embodiments of the invention it is to be understood that these embodiments are given by example only and not in a limiting sense.

I claim:

1. In a device for converting one signal into another signal according to a compensation principle, with a pressure transducer with a pressure-dependent moveable element, an electromagnetic force transducer, a moveable part of the force transducer standing in connection with the element, and a position indicator transmitter which converts the movement of the pressure transducer into a control signal for one of the transducers, the improvement wherein the pressure transducer comprises two bellows with slightly different operative surfaces respectively, each of said surfaces being fixed on one end thereof, and the other ends of said operative surfaces being connected with one another and with the moveable element, and said surfaces being subjected to the same pressure, a lever rotatably mounted at a fulcrum, said moveable element and the moveable part of the force transducer engage said lever at different positions of said lever and said position indicator transmitter has a moveable part, the latter engages said lever at another position of said lever remote from said fulcrum, said lever has two arms, a single of said arms respectively being on each side of said fulcrum, the moveable element, the moveable part of the force transducer, and said moveable part of said position indicator transmitter engage on one of said arms of said lever, and a counterweight is disposed on the other of said arms of said lever.

2. In a device for converting one signal into another signal according to a compensation principle, with a pressure transducer with a pressure-dependent moveable element, an electromagnetic force transducer, a moveable part of the force transducer standing in connection with the element, and a position indicator transmitter which converts the movement of the pressure transducer into a control signal for one of the transducers, the improvement wherein the pressure transducer comprises two bellows with slightly different operative surfaces respectively, each of said surfaces being fixed on one end thereof, and the other ends of said operative surfaces being connected with one another and with the moveable element, and said surfaces being subjected to the same pressure, a lever rotatably mounted at a fulcrum, said moveable element and the moveable part of the force transducer engage said lever at different positions of said lever and said position indicator transmitter has a moveable part, the latter engages said lever at another position of said lever remote from said fulcrum, a spring operatively engages said lever at still another remote position from said fulcrum, said lever has two arms, a single of said arms respectively being on each side of said fulcrum, the moveable element, the moveable part of the force transducer, and said moveable part of said position indicator transmitter engage on one of said arms of said lever, and a counterweight is disposed on the other of said arms of said lever.

3. The device according to claim 2, wherein said spring engages on said one arm of said lever.

4. The device as set forth in claim 2, further comprising a holder having a wall, said one end of each of said two bellows are fixed to said holder, said two bellows extend inside said holder spaced from said wall, said operative surfaces of said two bellows have external sides and internal sides, said external sides and said wall define a substantially annular pressure chamber communicating simultaneously with pressure in said chamber on both said external sides of both of said two bellows, and said internal sides of both of said operative surfaces of said two bellows communicate simultaneously with ambient pressure.

5. In a device for converting one signal into another signal according to a compensation principle, with a pressure transducer with a pressure-dependent moveable element, an electromagnetic force transducer, a moveable part of the force transducer standing in connection with the element, and a position indicator transmitter which converts the movement of the pressure transducer into a control signal for one of the transducers, the improvement wherein the pressure transducer comprises two bellows with slightly different operative surfaces respectively, each of said surfaces being fixed on one end thereof, and the other ends of said operative surfaces being connected with one another and with the moveable element, and said surfaces being subjected to the same pressure, said surfaces simultaneously are subjected to said same pressure on one side and said surfaces simultaneously are subjected to a reference pressure on the other side.

6. The device as set forth in claim 5, wherein said one side is externally relative to said surfaces and said other side is internally relative to said surfaces.

7. The device as set forth in claim 5 or 6, wherein said reference pressure is ambient pressure.

8. The device as set forth in claim 5, wherein said operative surfaces of each of said two bellows have different wave form characteristics.

9. In a device for converting a pneumatic or hydraulic pressure into an electrical current according to a compensation principle, with a pressure transducer with a pressure-dependent moveable element, an electromagnetic force transducer, a moveable part of the force transducer standing in connection with the element, and a position indicator transmitter which converts the movement of the pressure transducer into a control signal for one of the transducers, the improvement wherein the pressure transducer comprises two bellows with slightly different operative surfaces respectively, each of said surfaces being fixed on one end thereof, and the other ends of said operative surfaces being connected with one another and with the moveable element, and said surfaces being subjected to the same pressure, a lever rotatably mounted at a fulcrum, said moveable element and the moveable part of the force transducer engage said lever at different positions of said lever and said position indicator transmitter has a moveable part, said position indicator transmitter has a stationary coil, said moveable part of said position indicator transmitter engages said lever and is a plunger-type armature moveably disposed coaxially inside of said coil and operatively cooperating therewith.

10. The device as set forth in claim 9, wherein said moveable part of said position indicator transmitter engages said lever at another position of said lever remote from said fulcrum.

11. In a device for converting one signal into another signal according to a compensation principle, with a pressure transducer with a pressure-dependent moveable element, an electromagnetic force transducer, a moveable part of the force transducer standing in connection with the element, and a position indicator transmitter which converts the movement of the pressure transducer into a control signal for one of the transducers, the improvement wherein the pressure transducer comprises two bellows with slightly different operative surfaces respectively, each of said surfaces being fixed on one end thereof, and the other ends of said operative surfaces being connected with one another and with the moveable element, and said surfaces being subjected to the same pressure, a lever rotatably mounted at a fulcrum, said moveable element and the moveable part of the force transducer engage said lever at different positions of said lever, said position indicator transmitter has a nozzle and a portion of said lever is adjacent said nozzle and constitutes a baffle plate cooperating with said nozzle, said portion of said lever is located at another position of said lever remote from said fulcrum.

12. The device as set forth in claim 1, 2, 9 11 or 10 wherein said another position of said lever is further remote from said fulcrum than said different positions.

* * * * *